United States Patent [19]
Daniel

[11] Patent Number: 5,930,948
[45] Date of Patent: Aug. 3, 1999

[54] DEVICE FOR PROTECTING SHRUBBERY AND OTHER PLANTS FROM DEER AND OTHER ANIMALS

[76] Inventor: Clarence H. Daniel, 45050 Mather La., Chagrin Falls, Ohio 44022-4002

[21] Appl. No.: 08/908,836

[22] Filed: Aug. 8, 1997

[51] Int. Cl.⁶ ..................................................... A01G 13/00
[52] U.S. Cl. ................................... 47/26; 47/21; 47/28.1; 135/900; 135/158; 256/24
[58] Field of Search .................... 47/26, 21, 20, 47/30, 28.1; 135/900, 901, 902, 133, 135, 119, 115, 147, 158, 159; 256/24, 25, 23, 65, 66

[56] References Cited

U.S. PATENT DOCUMENTS

| | | | |
|---|---|---|---|
| 90,054 | 5/1869 | Searle | 135/133 X |
| 641,946 | 1/1900 | McFarland | 47/21 |
| 1,011,017 | 12/1911 | Bevill . | |
| 1,125,378 | 1/1915 | Nichols . | |
| 1,748,085 | 2/1930 | Shorey | 47/21 |
| 2,009,867 | 7/1935 | Ball . | |
| 2,953,870 | 9/1960 | Nelson . | |
| 2,996,842 | 8/1961 | Weston . | |
| 3,816,959 | 6/1974 | Nalle, Jr. . | |
| 4,395,844 | 8/1983 | Jopson . | |
| 4,768,307 | 9/1988 | Holowecky . | |
| 4,858,380 | 8/1989 | Gayle . | |
| 5,090,155 | 2/1992 | Rodgers . | |
| 5,287,872 | 2/1994 | Anderson | 135/900 X |

*Primary Examiner*—Lynne A. Reichard
*Assistant Examiner*—David E. Bochna
*Attorney, Agent, or Firm*—Renner, Otto, Boisselle & Sklar, P.L.L.

[57] ABSTRACT

A plant protection device for protecting plants from being eaten or otherwise damaged by animals includes a center support for supporting an umbrella like top frame having a plurality of radially outwardly extending arms or rods angularly spaced from one another. Connected to the outer ends of the rods is a cord that provides a closed loop all the way around the center support. Flexible netting completely covers the top frame and extends down from the cord to the ground where it is staked at spaced apart intervals.

30 Claims, 5 Drawing Sheets

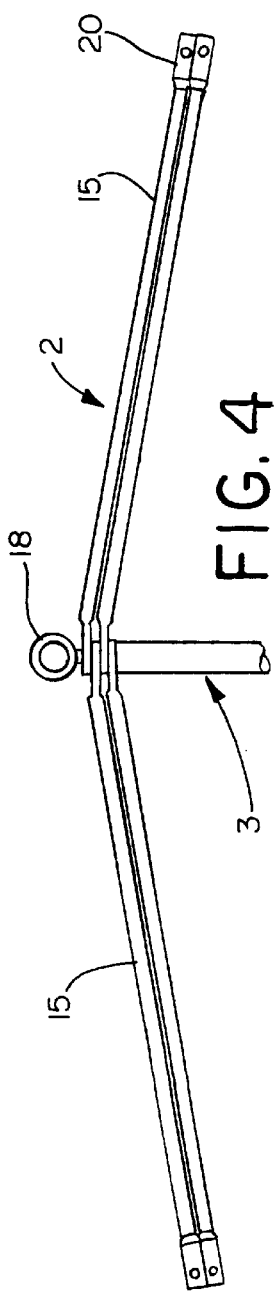
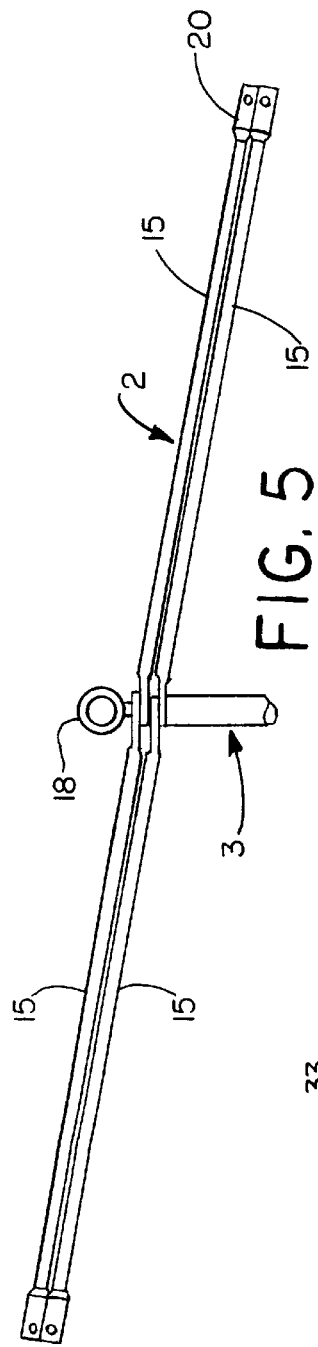
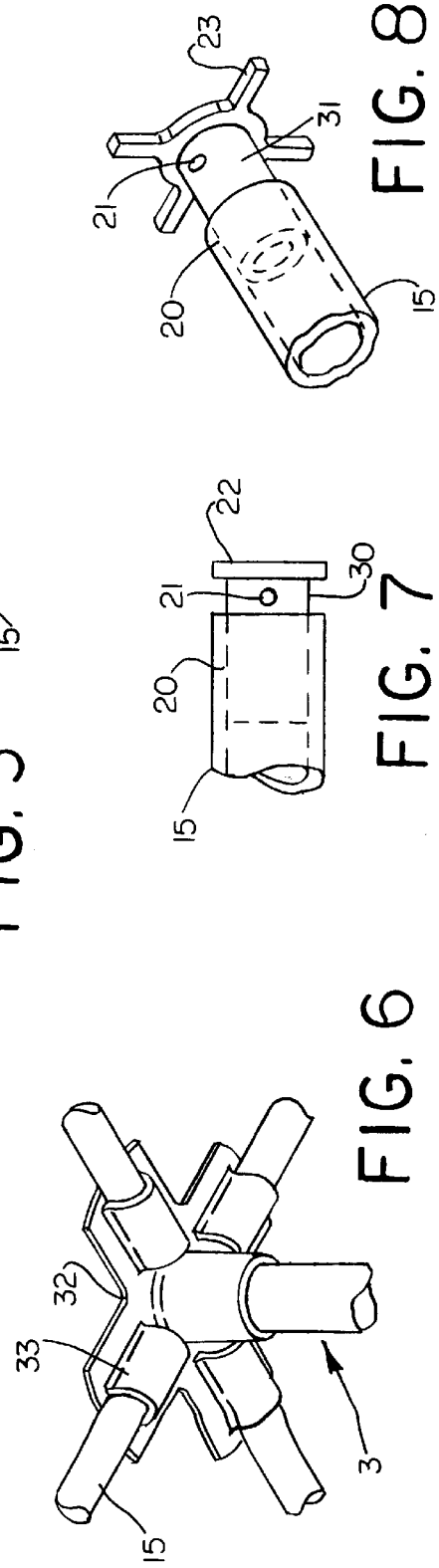

DEVICE FOR PROTECTING SHRUBBERY AND OTHER PLANTS FROM DEER AND OTHER ANIMALS

FIELD OF THE INVENTION

This invention relates generally to a plant protection device for covering shrubbery and other plants with flexible netting to prevent deer and other animals from eating the plant foliage and blossoms or otherwise damaging the plants.

BACKGROUND OF THE INVENTION

It is generally known to provide cage type supports for supporting flexible netting and the like over small plants and shrubs (including vegetables) to protect them from damage by deer and other foraging animals.

One of the drawbacks of previous known supports of this type is that each support will only protect a single plant up to a given size. This necessitates providing supports in a wide range of sizes to conform to a wide range of types and sizes of plants. Also, such supports do not readily lend themselves to protecting plants that are planted close together or close to a house or other building structure. Nor do such supports readily lend themselves to protecting plants in a garden plot. Furthermore, the supports do not readily permit access to the protected plants without completely removing all of the netting covering the plants.

SUMMARY OF THE INVENTION

The plant protection device of the present invention provides a simple and versatile way of protecting a wide variety of types and sizes of plants from being eaten or damaged by deer and other animals.

In accordance with one aspect of the invention, a single size plant protection device can readily be adapted to protect different shapes and sizes of plants.

In accordance with another aspect of the invention, the device can effectively be used to protect plants growing close up against houses and other building structures.

In accordance with another aspect of the invention, a plurality of such devices can readily be used to protect shrubs or plants planted close together, including plants in a garden plot.

In accordance with another aspect of the invention, the device can be configured to facilitate the blowing of leaves and snow and other debris off the netting.

In accordance with another aspect of the invention, the device can readily be folded to a smaller size for ease of storage when not in use.

In accordance with another aspect of the invention, the device allows for easy access to the protected plants through the top without having to remove any of the netting.

In accordance with another aspect of the invention, the device can quickly and easily be assembled and disassembled for storage and shipment, and all of the parts including the netting are reusable.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 4 is an enlarged side elevation view of the top frame of the device of FIG. 1 showing all of the top frame rods sloping downwardly and outwardly from the center support at a slight angle;

FIG. 5 is an enlarged side elevation view of the top frame similar to FIG. 4 but sewing two of the top frame rods sloping upwardly at a slight angle and the other two top frame rods sloping downwardly at a slight angle;

FIG. 6 is an enlarged perspective view of a holder for the top frame rods;

FIGS. 7 and 8 are respectively enlarged fragmentary side elevation and perspective views of the outer end of one of the top frame rods showing different end caps inserted into such ends;

DETAILED DESCRIPTION OF THE PREFERRED EMBODIMENTS

Figure 1:
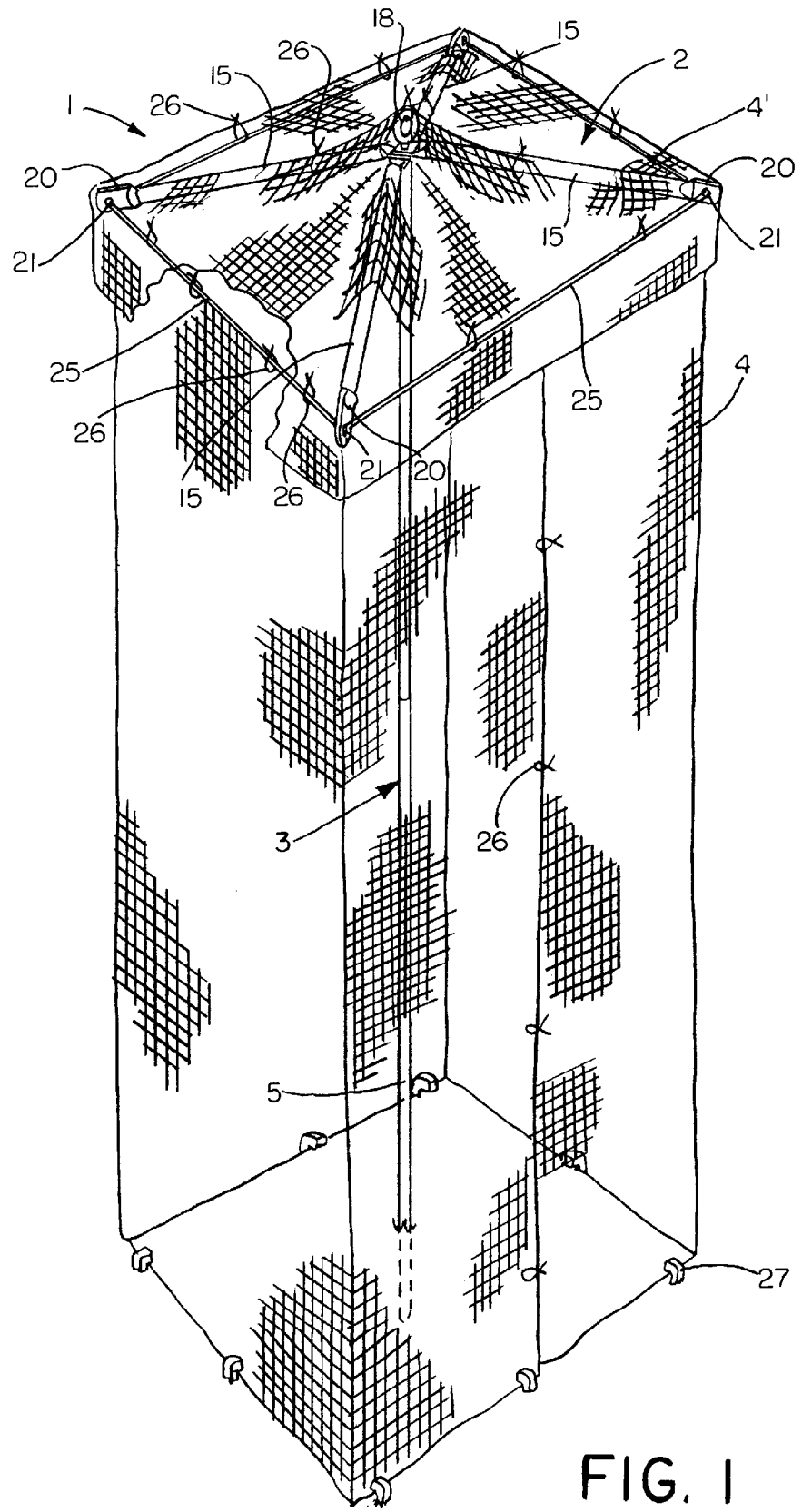
FIG. 1 is a schematic perspective view of one form of plant protection device in accordance with the present invention.
Figures 2, 3:
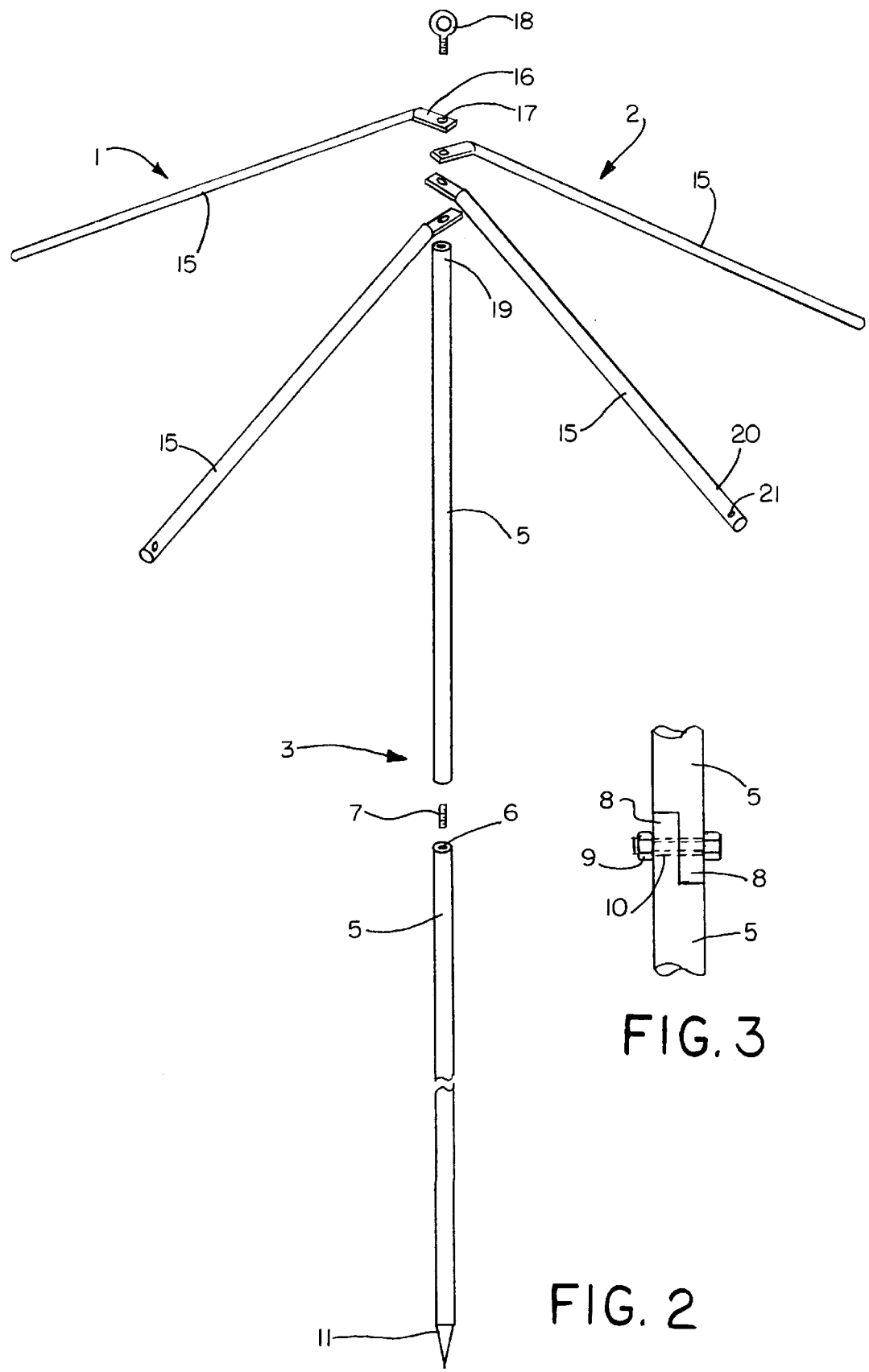
FIG. 2 is a fragmentary exploded view showing the center support and top frame of the device of FIG. 1 in disassembled form.
FIG. 3 is an enlarged fragmentary side elevation view of a modified form of center support for the device of FIG. 1.
Figure 9:
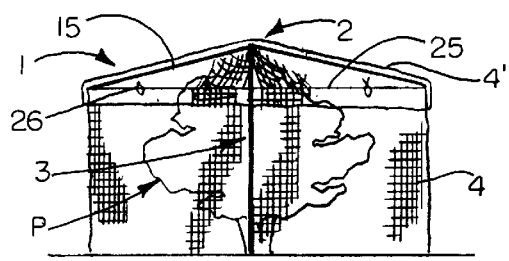
FIGS. 9 and 10 are respectively schematic side elevation and top plan views showing one plant protection device of this invention protecting a single plant.
Figure 10:
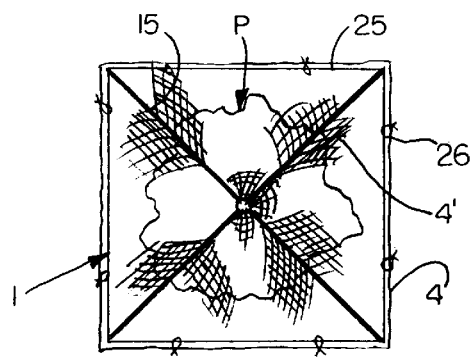

Referring now in detail to the drawings, and initially to FIGS. 1 and 2, there is shown one form of plant protection device 1 in accordance with the present invention including an umbrella-like top frame 2 and center support 3 for supporting flexible netting 4 over and around the plants to be protected as described hereafter. The center support 3 is comprised of one or more rods 5 each having a length for example of approximately three and one-half feet.

The number of rods 5 used to make up the center support 3 will vary depending on the height of the plants to be protected. If the plants are less than three and one-half feet high (e.g., less than the length of one center support rod), a single center support rod may be used to support the top frame 2. If the plants are taller than that, two or more center support rods 5 may be connected together as by providing tapped openings 6 in the ends of the rods and connecting the rods together using threaded studs 7 or the like as schematically shown in FIG. 2. Alternatively, the rods 5 may have stepped ends 8 permitting such ends to be placed in overlapping relation to each other and secured together using suitable fasteners 9 passing through aligned openings 10 in such overlapping ends 8 as schematically shown in FIG. 3.

The bottom end 11 of the lowermost center support rod 5 may be pointed as schematically shown in FIG. 2 to facilitate insertion of the lowermost rod into the ground adjacent the plant or plants to be protected.

The top frame 2 is comprised of one or more rods 15 each of which may for example be approximately nineteen and one-half inches long. In the embodiment illustrated in FIGS. 1 and 2, the top frame 2 is comprised of four such rods 15 each having a flattened inner end 16 with a single transverse hole 17 punched therethrough to permit the inner ends of the rods to be stacked one on top of another with the holes 17 in alignment and secured to the uppermost end of the center support 3 as by means of a threaded eyebolt 18 passing through the holes 17 and threadedly engaging the upper end 19 of the uppermost center support rod. This allows the individual top frame rods 15 to be pivoted relative to each other about the center eyebolt 18 to vary the spacing between the rods 15 so that the rods better match the shape of the plant or plants to be protected therebeneath as described hereafter.

At the outer ends 20 of the top frame rods 15 are transverse holes 21 (shown in FIGS. 1, 2, 4, 5, 7 and 8) and/or knobs 22 (shown in FIG. 7) or fingers 23 (shown in FIG. 8) to permit a continuous length of soft metal wire or plastic cord 25 (shown in FIGS. 1 and 9–15) or the like to be strung between the outer ends of the rods and either passed through the holes or wrapped around the knob end or fingers for securing the cord thereto. As used herein, the term cord (or cords) includes wire as well as plastic.

The purpose of the cord 25 is to permit a continuous length of the flexible netting 4 to be suspended from the cord extending between the ends of the top frame rods 15 around the entire periphery of the plant protection device 1 using suitable twisters or ties 26 to attach the upper edge of the netting to the cord. The netting 4 extends all the way to the ground and may be anchored thereto at spaced apart intervals using suitable stakes 27 or the like as schematically shown for example in FIG. 1. Also, the ends of the netting 4 are desirably tied together in overlapping relation using suitable ties or twisters 26 every foot or so along the height of the netting as further shown in FIG. 1.

The top frame 2 is also covered by netting 4' which is draped over the cord 25 and tied thereto using suitable ties or twisters 26 at spaced apart intervals along the length of the cord. Also, the top netting 4' may be secured to the eyebolt 18 at the center and along the length of the top frame rods 15 using suitable ties or twisters 26.

The top netting 4' is desirably draped over the top frame 2 after the side netting 4 is secured to the cord 25 so that access to the interior of the plant protection device 1 can be gained simply by removing one or more associated ties and lifting up on the periphery on the top netting between other ties. Alternatively, access to the interior of the plant protection device may be obtained through the side netting by removing one or more of the twisters that hold the overlapping ends of the side netting together.

Preferably the rods 15 of the top frame 2 extend at a slight angle, for example, 10 to 15° relative to the inner ends 16 of the rods, so that when the rods are attached to the center support 3, the rods slope downwardly from the center support at a slight angle as schematically shown in FIGS. 1, 4, 9 and 10 to give the top netting 4' supported thereby enough of a slope to permit leaves and snow or the like to blow off the top netting.

Figure 11:
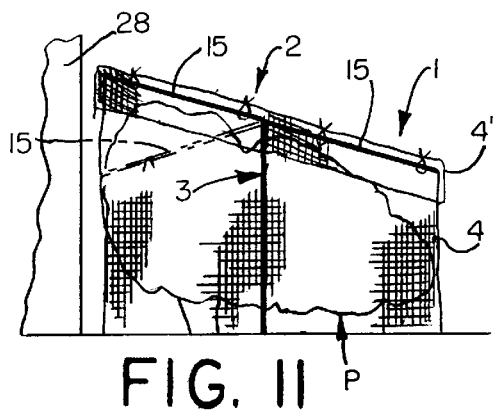
FIGS. 11 and 12 are respectively schematic side elevation and top plan views of another plant protection device of this invention protecting a plant in close proximity to a building structure.
Figure 13:
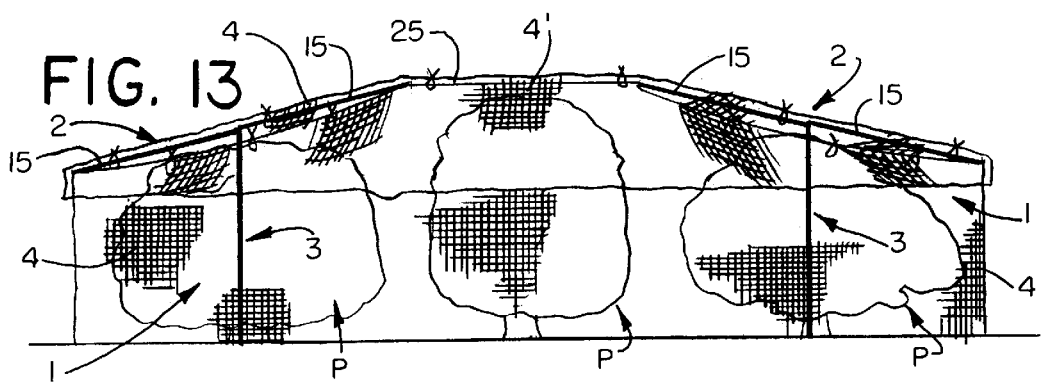
FIGS. 13 and 14 are respectively schematic side elevation and top plan views of two plant protection devices of this invention protecting three plants closely spaced together in a single row.

Making the top frame rods 15 angular relative to the inner ends 16 also permits one or more of the rods to be oriented so that they extend upwardly at a slight angle relative to the center support as schematically shown in FIGS. 5, 11 and 13. This is particularly advantageous where the center support 3 cannot be positioned directly over a plant because of its close proximity to a house or other building structure 28. In that case, the top frame rods 15 extending toward the building structure can be inverted (e.g., turned over) so that the rods will extend upwardly at a slight angle over the portion of the plant closest to the building structure as shown in solid lines in FIG. 11 rather than into the plant as schematically shown in phantom lines in FIG. 11.

The rods 5 and 15 for both the center support 3 and top frame 2 may be made of metal or plastic as desired. If the top frame rods are made of plastic, suitable end caps 30 or 31 may be inserted into the outer ends of the top frame rods 15, with holes 21 and/or knobs 22 or fingers 23 formed in the end caps (see FIGS. 7 and 8) for tying the cord 25 to the outer ends of the rods as previously described. If the center support rods are made of plastic, a plastic holder 32 having a plurality of radially extending sockets 33 for receipt of the inner ends of the top frame rods 15 may be fastened to the upper end of the center support 3 for mounting the top frame rods to the center support as schematically shown in FIG. 6.

If desired, either the sockets 33 in the holder 32 or the rods 15 themselves may be molded to extend at a slight angle from the holder, for example, 10 to 15°, to assist leaves and snow and the like in blowing off the netting supported by the top frame. The disadvantage in molding the holder sockets 33 at an angle is that it would not permit one or more of the rods to be inverted to extend at a slight upward angle adjacent a house or other building structure. Also, using a holder 32 for the top frame rods 15 would only permit variations in the position or orientation of the top frame rods relative to each other based on the number and orientation of the sockets in the holder.

Using an eyebolt 18 to secure the top frame rods 15 to the center support 3 has the further advantage that a screwdriver or the like can be inserted through the eyebolt for ease of tightening or loosening the eyebolt. Also, the eyebolt can be used for hanging the plant protection device 1 up in a garage or storage shed when not in use.

Before storing the plant protection device, the netting 4 and 4' and cord 25 may be removed or not as desired. The advantage in removing the netting and cord before storing the plant protection device is that all of the top frame rods 15 can then be moved into overlying relation with each other to minimize the space required to store the device. Of course, the entire device, including the top frame 2 and center support 3 could be completely disassembled prior to storage if desired.

Figure 12:
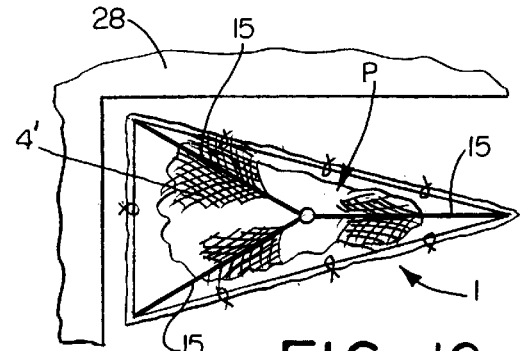

While the top frame 2 shown for example in FIGS. 1, 2, 4 and 5 is comprised of four rods 15, it should be understood that fewer or more rods may be used to make up the top frame depending on how many plants are being protected and the particular shapes of the plants. For example, where the plant P is relatively wide and one side is relatively narrow in width on another side, three rods 15 may be enough to form the top frame 3 as shown in FIGS. 11 and 12.

Figure 14:
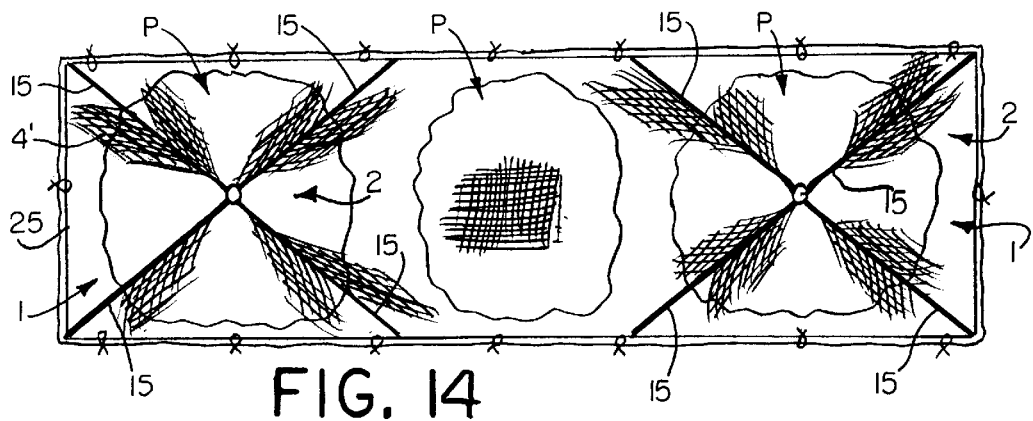
Figure 15:
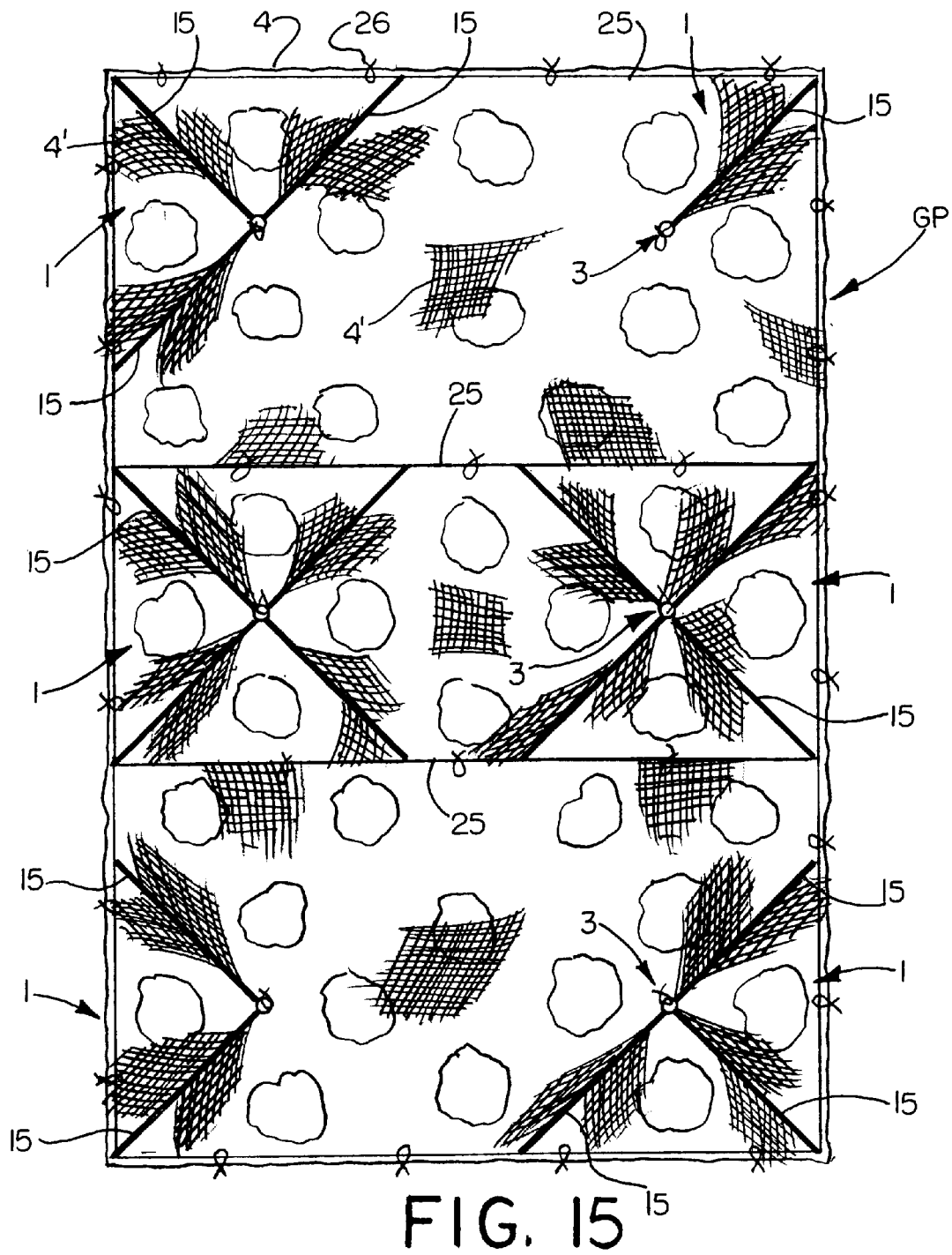
FIG. 15 is a schematic top plan view of a plurality of plant protection devices of this invention protecting a garden plot.

Also, where larger shrubs or several shrubs or plants P planted relatively close together are to be protected or where a garden plot is to be protected, a plurality of such plant protection devices may be positioned in spaced apart relation around the periphery of the plants or area to be protected. Likewise, any number of rods 15 may be used to form the top frame 2, depending on the size and shape of the area being protected. For example, where several plants P are planted relatively close together in a line, two or more plant protection devices 1 may be placed along the length of the plants, with the cord 25 extending between the outer ends of the rods of all of the plant protection devices as shown in FIGS. 13 and 14. Also, the top frame rods 15 may be oriented so that they extend at a slight angle upwardly or downwardly relative to their respective center supports 3 depending on their location relative to the plants and the particular size and shape of the plants being protected. In FIGS. 13 and 14, two such plant protection devices 1 are shown for use in protecting three plants in line. In this embodiment, the center supports 3 of the two devices are shown positioned at the approximate center of the two end plants. Also, two top support rods 15 of each device extending downwardly at a slight angle toward the opposite sides of the end plants and the other two top support rods 15 of each device are shown extending upwardly at a slight angle toward the center plant to support the top netting 4' draped over both top support frames 2.

Where the area to be protected is a larger area such as a garden plot GP, plant protection devices 1 may be placed adjacent each corner of the plot as well as adjacent one or more sides of the plot as schematically shown in FIG. 15. Moreover, the top frames 2 of the devices 1 may comprise one, two or three rods 15 having their outer ends in line with the outer periphery of the plot, depending on where they are located. As an example, the plant protection devices 1 that are placed adjacent the corners of the plot in FIG. 15 have top frames comprised of one, two or three rods 15 sloping downwardly from their respective center posts 3 with their outer ends in line with the perimeter of the plot for supporting a cord 25 extending all the way around the perimeter of the plot.

The intermediate plant protection devices 1 which are positioned adjacent one or more sides of the plot have top frames that include one or two rods extending outwardly to the perimeter of the plot preferably at a slight downward angle. Also, the top frames 2 of the intermediate plant protection devices may include one or more rods 15 extending inwardly toward the center of the plot, preferably upwardly at a slight angle, to provide additional support for the top netting 4' draped over the tops of all of the plant protection devices. In that event, additional cords 25 may be strung between the outer ends of the top frame rods 15 of the intermediate plant protection devices 1 as schematically shown in FIG. 15.

The side netting 4 should of course extend all the way around the periphery of the closely planted area or garden plot, with the upper edge of the side netting attached to the cord 25 at spaced apart intervals using suitable ties 26, and the lower edge staked to the ground at spaced apart intervals. Also, the ends of the side netting 4 should be tied together in overlapping relation at spaced apart intervals along the height of the netting as before. Likewise, the entire area staked out by the plant protection devices 1 should be covered by top netting 4' draped over all of the top frames 2 and cord 25 and tied off at spaced apart intervals along the length of the cord.

Depending on the width and length of rolls of netting 4 and 4' used and the overall height and perimeter of the area staked out by the plant protection devices 1, one or more strips of netting may have to be tied together to fully cover the sides and top of the area staked out. Netting comes, for example, in rolls having seven foot widths and forty foot lengths. Therefore, as long as the height of the outer ends of the top frame rods of the plant protection devices is seven feet or less, and the overall length of the perimeter of the area being protected is less than forty feet, a single strip of the netting may be used to cover the sides of the area being protected.

Likewise, if the top area to be covered is less than seven feet wide and forty feed long, one strip of the netting may be used to cover the entire protected area. If the top area to be protected is more than seven feet wide or forty feet long, two or more strips of netting may be run widthwise with the sides (and ends) of the strips overlapping each other and tied together and the ends extending down over the cord and tied thereto as before.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, said top frame rods having inner ends containing transverse holes in vertical alignment with each other, and an eyebolt extending through said holes into threaded engagement with said upper end of said center support.

2. The device of claim 1 wherein said top frame rods extend at an angle from said center support.

3. The device of claim 2 wherein at least one of said top frame rods slopes downwardly from said center support.

4. The device of claim 1 wherein said outer ends of said top frame rods have transverse holes through which said cord passes for connecting said cord to said outer ends.

5. The device of claim 1 wherein said center support comprises a plurality of support rods removably connected together.

6. The device of claim 1 wherein said inner ends of said top frame rods are pivotally connected to said upper end of said center support by said eyebolt to permit variations in the angular spacing between said top frame rods.

7. The device of claim 1 wherein said inner ends of said top frame rods have transverse holes in vertical alignment with each other, and a fastener extends through said holes into threaded engagement with said upper end of said center support.

8. The device of claim 7 wherein said fastener comprises an eyebolt.

9. A plurality of plant protection devices for use in protecting one or more plants from being eaten or otherwise damaged by animals, each of said plant protection devices comprising a center support having a lower end adapted to be inserted into the ground, and an upper end for supporting a top frame at an elevation above the plants to be protected, each said top frame comprising one or more rods extending radially outwardly from said upper end of said center support, a flexible cord connecting outer ends of one or more of said rods of one of said plant protection devices to outer ends of one or more of said rods of an other of said plant protection devices to define a closed loop surrounding the plants to be protected, and flexible netting covering all of said top frames of said one and said other of said plant protection devices and extending downwardly beyond said cord into contact with the ground.

10. The devices of claim 9 further comprising a plurality of ties for tying said netting to said cord.

11. The devices of claim 9 wherein said netting is staked to the ground at a plurality of spaced apart locations.

12. The device of claim 9 wherein a strip of said netting has an upper edge suspended from said cord at spaced apart intervals along the length of said cord, and a lower end staked to the ground at spaced apart intervals.

13. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, said top frame rods extending at an angle from said center support, at least one of said top frame rods sloping upwardly from said center support.

14. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, said top frame rods extending at an angle from said center support, at least one of said top frame rods sloping downwardly from said center support, and an other of said top frame rods sloping upwardly from said center support.

15. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, said outer ends of said top frame rods having knobs to aid in tying said cord to said outer ends.

16. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, said outer ends of said top frame rods having a plurality of fingers to aid in tying said cord to said outer ends.

17. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, flexible netting supported by said top frame and said cord, and end caps inserted into said outer ends of said top frame rods, said end caps having means to aid in fastening said cord to said outer ends.

18. A plant protection device comprising a center support having an upper end and a lower end, a top frame supported by said upper end, said top frame comprising a plurality of top frame rods extending radially outwardly from said center support in spaced relation from one another, a cord extending between outer ends of said top frame rods to provide a closed loop completely surrounding said center support, and flexible netting draped over said top frame and said cord, said top frame rods having inner ends received in radial sockets in a holder attached to said upper end of said center support.

19. A plant protection device comprising a center support having an upper end and a lower end, a top frame supported by said upper end, said top frame comprising a plurality of top frame rods extending radially outwardly from said center support in spaced relation from one another, a cord extending between outer ends of said top frame rods to provide a closed loop completely surrounding said center support, and flexible netting draped over said top frame and said cord, at least one of said top frame rods sloping downwardly from said center support at a slight angle, and an other of said top frame rods sloping upwardly from said center support at a slight angle.

20. The device of claim 19 wherein the slope of said downwardly and upwardly sloping rods is substantially the same.

21. The device of claim 20 wherein the slope of said downwardly and upwardly sloping rods is approximately 10 to 15° from the horizontal.

22. A plurality of plant protection devices for use in protecting one or more plants from being eaten or otherwise damaged by animals, each of said plant protection devices comprising a center support having a lower end adapted to be inserted into the ground, and an upper end for supporting a top frame at an elevation above the plants to be protected, each said top frame comprising one or more rods extending radially outwardly from said upper end of said center support, a flexible cord extending between outer ends of one or more of said rods of each of said plant protection devices to define a closed loop surrounding the plants to be protected, and flexible netting covering all of said top frames and extending downwardly beyond said cord into contact with the ground, a strip of said netting having an upper edge suspended from said cord at spaced apart intervals along the length of said cord, and a lower end staked to the ground at spaced apart intervals, said strip of netting having opposite ends in overlying relation to one another.

23. The devices of claim 22 wherein said ends of said strip of said netting are fastened together at spaced apart intervals along said ends.

24. The devices of claim 22 wherein an other strip of said netting is draped over all of said top frames.

25. The devices of claim 24 wherein said other strip of said netting has an outer edge that extends downwardly over said upper edge of said strip of said netting, and said other strip of said netting is tied to said cord at spaced apart intervals along the length of said cord.

26. The devices of claim 22 wherein one or more of said rods of one or more of said devices slope downwardly from their respective center supports at a slight angle.

27. The devices of claim 26 wherein other of said rods of one or more of said devices slope upwardly from their respective center supports at a slight angle.

28. A plant protection device comprising a center support having an upper end and a lower end adapted to be inserted into the ground, a top frame supported by said upper end, said top frame comprising a plurality of top frame rods extending radially outwardly from said center support in spaced relation from one another, said top frame rods having outer ends to which a continuous flexible cord is connected to provide a closed loop completely encircling said center support, and flexible netting supported by said top frame and said cord, a strip of said netting having an upper edge suspended from said cord at spaced apart intervals along the length of said cord, and a lower end staked to the ground at spaced apart intervals, said strip of netting having opposite ends in overlying relation to one another.

29. The device of claim 28 wherein said ends of said strip of said netting are fastened together at spaced apart intervals along said ends.

30. The device of claim 28 wherein an other strip of said netting is draped over said top frame and has an outer edge that extends downwardly over said upper edge of said strip of said netting, and said other strip of said netting is tied to said cord at spaced apart intervals along the length of said cord.

* * * * *